Figure 1:
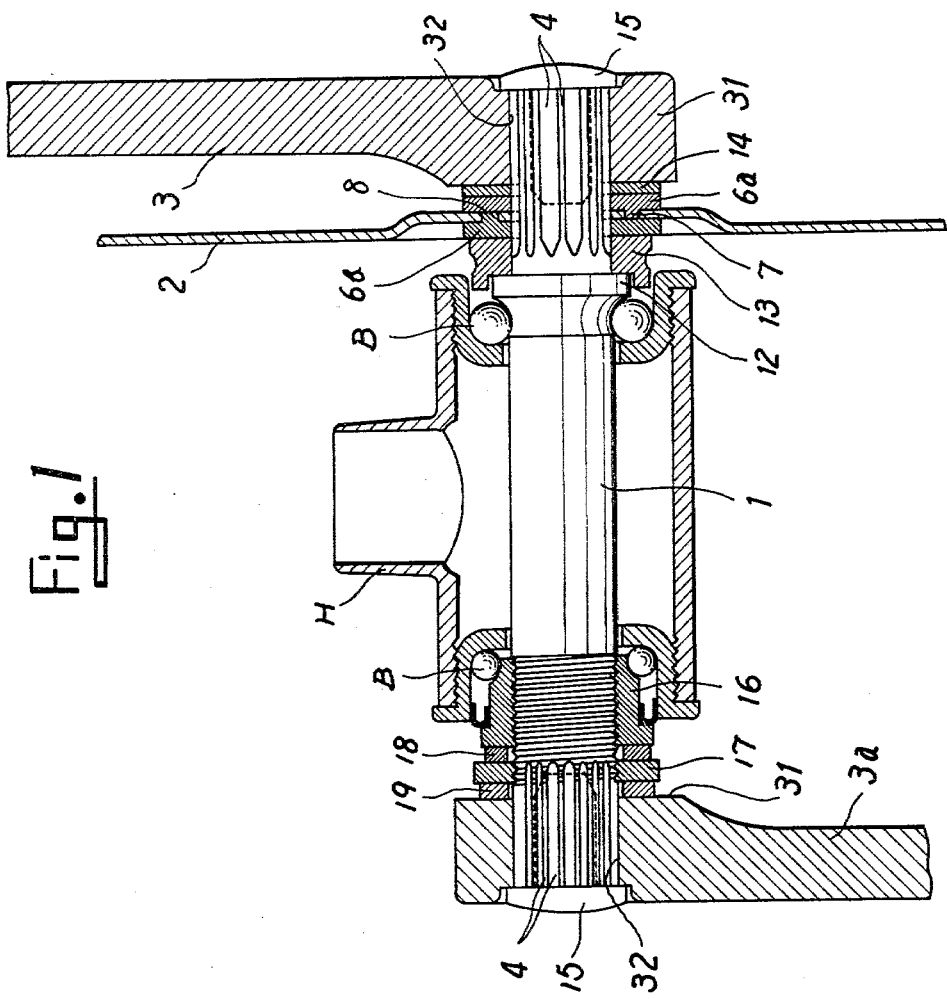

United States Patent [19]

Segawa

[11] 4,201,120
[45] May 6, 1980

[54] GEAR CRANK FOR BICYCLES

[75] Inventor: Takashi Segawa, Sakai, Japan

[73] Assignee: Shimano Industrial Company Limited, Osaka, Japan

[21] Appl. No.: 874,530

[22] Filed: Feb. 2, 1978

[30] Foreign Application Priority Data

Feb. 5, 1977 [JP] Japan .......................... 52/12710[U]

[51] Int. Cl.² ................................................ G05G 1/14
[52] U.S. Cl. ................................ 74/594.2; 308/179.5
[58] Field of Search .......................... 74/594.1, 594.2; 308/179.5, 23.5; 301/2.5

[56] References Cited

U.S. PATENT DOCUMENTS 2,277,748   3/1942   Duffy ........................... 74/594.1

FOREIGN PATENT DOCUMENTS 59702   3/1949   France ........................... 74/594.1
11545   of 1896   United Kingdom .......... 74/594.2

Primary Examiner—Kenneth Dorner
Attorney, Agent, or Firm—Stevens, Davis, Miller & Mosher

[57] ABSTRACT

A gear crank for a bicycle, which comprises a crank shaft, a pair of crank arms and a chain gear, is provided with concave and convex portions which are formed at both ends of the crank shaft and extending axially thereof so as to be fitted with concave and convex portions formed at a boss of each of the crank arms respectively, gear-fixing plates each of ring-like shape which have concave and convex portions fitted with the concave and convex portions at the crank shaft and are inserted onto the crank shaft together with the chain gear, and an engagement arranged between the chain gear and gear-fixing plates, so that the chain gear may be fixed to the crank shaft by use of a fixing member for fixing one of the crank arms to the crank shaft.

6 Claims, 2 Drawing Figures

GEAR CRANK FOR BICYCLES

This invention relates to a gear crank for a bicycle and, more particularly, to a gear crank for a bicycle which comprises a crank shaft, a pair of crank arms and a chain gear, at least one of the crank arms being formed independently of the crank shaft and fixed thereto together with the chain gear by means of a fixing means.

A conventional gear crank for a bicycle includes a well-known two or three piece assembly commonly termed a separate type where one or both crank arms are separately formed so as to be fixed to the crank shaft, as opposed to the so-called one-piece type of crank where a pair of crank arms are incorporated with the crank shaft.

The gear crank of the separate type, for example, the three piece crank, is assembled in such a manner that each of the crank arms is provided with a bored boss so that the left crank arm is inserted onto the left end of the crank shaft through the bore and fixed thereto by a cotter pin in relation of being non-rotatable and non-removable, while, the right crank arm has its boss axially extended, which boss is fixed integrally to the chain gear. The right crank arm angled with respect to the retained left crank arm is fixed to the crank shaft in the same manner as is the left crank arm.

The right crank arm, which is integrated with the chain gear through the boss onto one end of which the chain gear is forcibly inserted through its center bore, is fixedly secured to keep the chain gear in parallel to the crank arm. Hence, the gear crank is difficult to assemble and the assembly requires precision workmanship and much time, resulting in a high manufacturing cost.

Furthermore, when the bicycle happens to collide or fall down the right crank arm, for example, may become bent so as not to be completely repairable. As a result the damaged crank arm cannot alone be replaced and is accompanied by replacement of the chain gear as well, hence, repairs are expensive and wasteful. Similarly, if the chain gear becomes worn or damaged, it must be replaced together with the right crank arm.

The invention has been designed to eliminate the aforesaid problems. An object of the invention is to provide a gear crank for the bicycle which has a chain gear which is not integrally fixed with the right crank arm and which is therefore easily replaced and which ensures that the crank arms are fixedly mountable to the crank shaft and accurately positioned with respect thereto.

In detail, the invention is characterized in that the chain gear and right crank arm can be independently fixedly mountable to the crank shaft so as to be detachable therefrom and able to reliably transmit to the chain the driving force caused by pedalling. This is achieved by providing at the outer periphery of at least one end of the crank shaft a plurality of concave and convex portions extending axially of the crank shaft. The inner periphery of the bored boss of at least one of the crank arms is in turn provided with a plurality of mating concave and convex portions to be fitted with the concave and convex portions of the shaft. Gear-fixing plates each of a ring-like shape and having at its inner periphery a plurality of convex and concave portions adapted to be fitted with the concave and convex portions of the crank shaft are also provided so that the chain gear may be fixed to the crank shaft through the plates at the same time that the right crank arm is fixed to the crank shaft.

Figure 2:
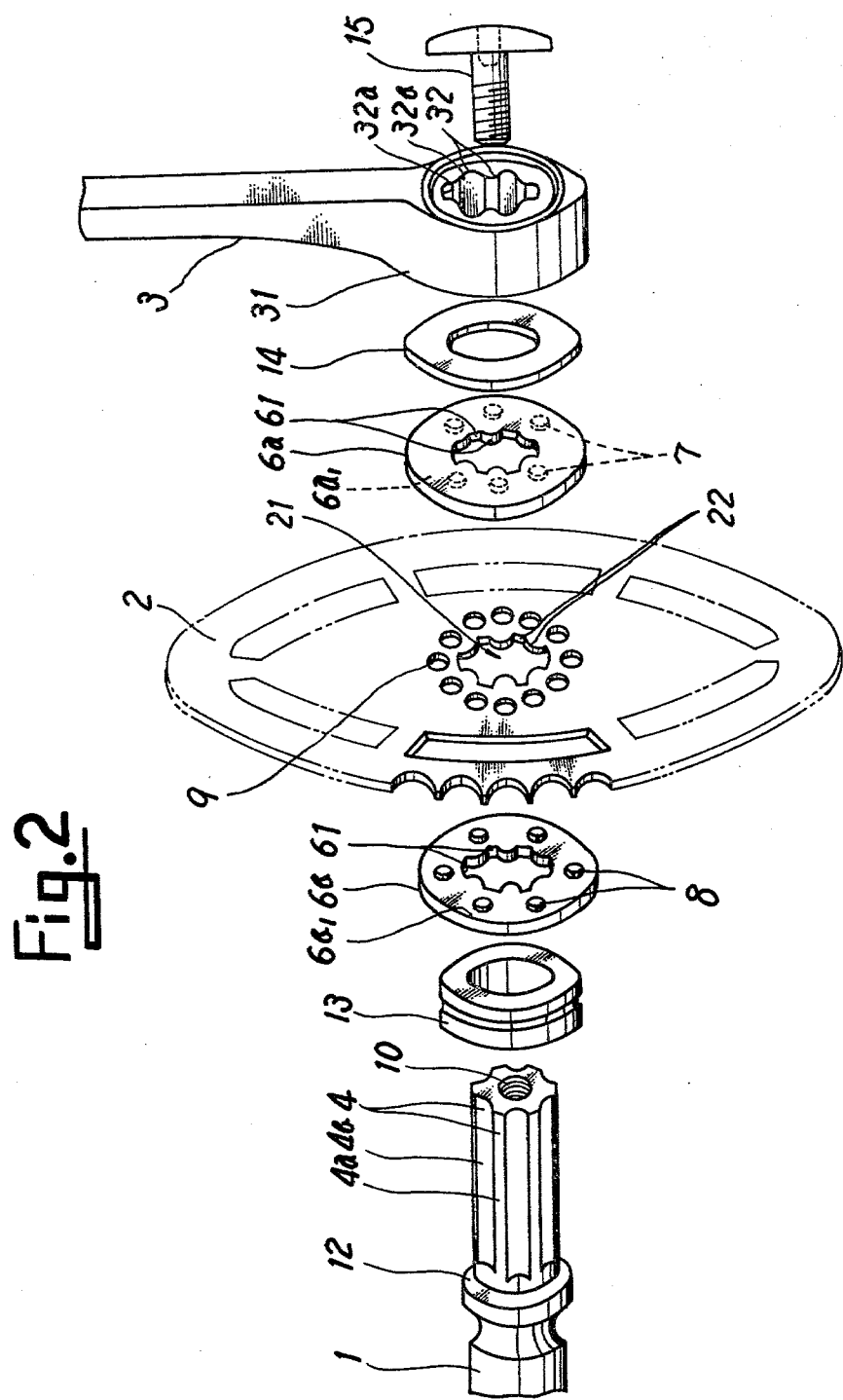

The above and other objects and characteristics will be apparent from the following description of an embodiment of the invention and in accordance with the accompanying drawings, in which:

FIG. 1 is a partially omitted longitudinal sectional view of the crank of the invention, which is attached to the bicycle, and FIG. 2 is a partially omitted perspective exploded view thereof.

Referrring to FIG. 1, the reference letter H designates a bracket lug of the bicycle frame and B, balls through which the crank shaft 1 is rotatably supported to the bracket lug H.

The crank shaft 1 is longer than an axial length of the bracket lug H and has at both axial ends a plurality of concave and convex portions 4 extending axially therefrom.

The concave and convex portions 4 need not be provided at both ends of the crank shaft 1 as shown in the drawings, but are at least provided at the right end of crank shaft 1 to which the chain gear 2 is attached. The concave and convex portions 4 need not be defined in any particular formation but are preferably arranged in a circular continued waving pattern when viewed in section.

The crank shaft 1 is tapered at both ends to be slightly diametrically smaller toward the outermost ends. To both the tapered ends are insertably mounted right and left crank arms 3 and 3a each of which has at one end a bored boss 31. The boss 31 of each crank arm is preferably tapered at the inner periphery thereof so as to be fitted with a respective tapered end of the crank shaft 1.

At the inner periphery of the boss 31 of each of the crank arms 3 and 3a are provided a plurality of convex and concave portions 32 to be fitted respectively onto the concave and convex portions 4 formed at the outer periphery of the ends of the crank shaft 1. Each of recesses 32a between the convex and concave portions 32 is made larger in depth than the height of each of projections 4a between the concave and convex portions 4 and also each convex portions 32b at the convex and concave portions 32 is made smaller in height than the depth of each concave 4b at the crank shaft 1, so that both the crank arm and crank shaft are, when fitted with each other, made to have minimum clearances between the concave and convex portions and the recesses and projections respectively.

The boss 31 of the right crank arm 3 need not be extended as conventional and may be identical with that of the left crank arm 3a.

At the inner periphery of the center bore 21 of chain gear 2 to be mounted to one end of the crank shaft 1 are provided a plurality of convex and concave portions 22 to be fitted with the concave and convex portions 4 at the crank shaft 1 respectively. The entire inner periphery of the center bore 21 need not be provided with convex and concave portions 22, as long as all of the portions 22 are not replaced necessary by only a round bore.

The reference numerals 6a and 6b designate gear-fixing plates each of a ring-like shape. The plates 6a and 6b sandwich the chain gear 2 between them, and each has at its inner periphery a plurality of convex and concave portions 61 for mating with the concave and convex portions of the crank shaft 1. Each plate 6a and 6b also has on one side 6a₁ and 6b₁ facing the chain gear a plurality of projections 7 and 8 extending axially thereof respectively.

When the two gear-fixing plates 6a and 6b are engaged with the crank shaft 1 and in contact with both sides of the chain gear 2, the projections 7 of the right plate 6a and those 8 of the left plate 6b *are disposed to be interposed between each other, the projections 7 and 8 being slightly smaller in height than the thickness of chain gear 2.*

The chain gear 2 to be sandwiched between the plates 6a and 6b is provided with bores 9 into which the projections 7 and 8 are closely inserted from both sides of the chain gear 2.

The bores 9, of course, correspond in number to the number of projections 7 and 8. When sandwiched between both plates 6a and 6b through the insertion of the projections 7 and 8 into the bores 9 respectively, the chain gear 2 is brought into close contact at both sides thereof with the opposite faces $6a_1$ and $6b_1$ of gear-fixing plates 6a and 6b because of the projections 7 and 8 being smaller in height than the thickness of chain gear 2.

In the aforesaid embodiment, the projections 7 and 8 are provided at the gear-fixing plates 6a and 6b and the bores 9, at the chain gear 2, but the projections and bores may be provided alternately on the plates and gear or may be replaced by a plurality of projections formed at the opposite faces $6a_1$ and $6b_1$ to be extended radially thereof, or by rough faces only. In short, any means may be provided to integrate both the plates 6a and 6b with the chain gear 2 in the direction of rotation thereof.

A screw thread is used for fixing the crank arms 3 and 3a and chain gear 2 to the crank shaft 1, that is, a threaded bore 10 is formed at the end face of the crank shaft 1, or a small diameter spindle (not shown) is extended from one end of the shaft, so that a clamp screw 15 is screwed into the threaded bore 10 or a tightening nut (not shown) is screwed onto the spindle.

A ring-like shaped stopper 12 is mounted at the inner ends of concave and convex portions 4 at the crank shaft 1, and washers 13 and 14 are inserted between the stopper 12 and left gear-fixing plate 6b and the right plate 6a and right crank arm 3 respectively.

The gear crank of the invention constructed as aforegoing can be dismantled as shown in FIG. 2. Each part is assembled in such a manner that the crank shaft 1 is journaled to the bracket lug H of the bicycle frame, the washer 13 is inserted onto the crank shaft 1 from the right end thereof so as to be abutted against the stopper 12, the left gear-fixing plate 6b with its projections 8 directing rightward is inserted onto the crank shaft 1 through the convex and concave portions 61 fitted with the concave and convex portions 4 respectively, the chain gear 2 is inserted onto the crank shaft 1 through the engagement of the convex and concave portions 22 with the concave and convex portions 4 so as to allow the bores 9 to be inserted with the projections 8 at the left plate 6b, and the right gear-fixing plate 6a with its projections 7 directing leftward is inserted onto the crank shaft similarly to the left plate 6b so as to allow the projections 7 to be inserted into the bores 9 respectively, thus sandwiching the chain gear 2 between both the gear-fixing plates 6a and 6b through mutually interposed projections 7 and 8, and then the right crank arm 3 is, after inserting the washer 14, insertably attached through its convex and concave portions 32 engaged with the concave and convex portions 4 of the crank shaft 1, and the clamp screw 15 is screwed into the threaded bore 10 at the end face of crank shaft 1 so as to tighten all the above inserted parts. At this time, the right end of the crank shaft 1 and the boss 31 of the right crank arm 3 are fitted tightly with each other through both the slightly axially tapered outer and inner peripheries and the minimum gaps between the concave and the corresponding convex portions at both the members, so that the crank arm 3 may be fixedly mounted to the crank shaft 1 accurately in position, and also the chain gear 2 may be fixed thereto through both gear-fixing plates 6a and 6b.

The chain gear 2, which is sandwiched by both plates 6a and 6b, is pushed leftward by the clamp screw 15 and abutted against the stopper 12 through the washer 13 and plate 6b, thereby being secured and prevented from axially shaking. Furthermore, the fitting of the concave and convex portions 4 of the crank shaft 1 with the convex and concave portions 22 of the chain gear 2 and with the convex and concave portions 61 of both the gear-fixing plates 6a and 6b and the insertion of the projections 7 and 8 thereof into the bores 9 of the chain gear 2, make it possible to secure the chain gear 2 to the crank shaft 1 without the occurence of any circumferential slip.

When pedalling the crank arms, the driving force is precisely transmitted to a driving chain (not shown) meshed with the chain gear 2 so that the latter or crank arm 3 may not be loosened and cause shaking. In addition, the intermediate portion of the right crank arm 3 at a side of the chain gear 2 may be provided with a projection (not shown) directed toward the chain gear 2 which may be inserted into a corresponding bore in the chain gear 2, so that the construction of the invention is further effective.

At the left end of the crank shaft 1 is fixed the left crank arm 3a through a threaded bore 10 formed at the left end face of the crank shaft 1 which is screwed with a clamp screw 15. Alternatively an outer-threaded spindle screwed with a tightening nut may be employed to fix the left crank arm 3a to shaft 1. Since no chain gear is attached to the left side of the crank shaft no gear-fixing plates are required. To complete the description of FIG. 1, the reference numeral 16 designates a ball holder screwed with the left end of crank shaft 1; numeral 17 designates a lock nut; and numerals 18 and 19 designate washers.

The aforesaid construction at the left end of crank shaft 1 is unnecessary for the so-called two piece crank assembly in which the left crank arm 3a is incorporated with the axially left end of the crank shaft 1, thus requiring the aforesaid construction at the axially right end only.

As is evident, the crank arms 3 and 3a and chain gear 2 assembled with the crank shaft 1 are capable of being dismantled easily therefrom by a reverse of the assembly procedure described above so that only one of crank arms and chain gear, if damaged by collision or the like, needs to be removed for repair or replacement.

As clearly seen from the above description, the gear crank of the invention can not only dispence with a process of fixedly integrally securing the chain gear to the crank arm, but also allows for an exchange in the combination of crank arms and chain gear, resulting in a remarkable improvement of the combination works.

While an embodiment of the invention has been shown and described, the invention is not limited to the specific construction thereof, which is merely exemplified in the specification rather than defined.

What is claimed is:

1. A gear crank for a bicycle, comprising a crank shaft, a pair of crank arms and a chain gear, at least one of said crank arms being formed separately from said crank shaft to be fixed thereto together with said chain gear by a fixing means, said gear crank further comprising;

a plurality of concave and convex portions formed at the outer periphery of at least one axial end of said crank shaft and extending axially thereof;

a boss formed at one lengthwise end of one of said crank arms, said one crank arm being mounted to said one axial end of the crank shaft together with said chain gear, said boss having a bore therein which defines at its inner periphery concave and convex portions which are fitted with said concave and convex portions of the crank shaft;

a bore formed at the center of said chain gear through which bore said chain gear is fitted onto said crank shaft;

gear-fixing plates for fixing therewith said chain gear to said crank shaft, each of said plates being formed in a ring-like shape and having at the inner periphery concave and convex portions fitted with said concave and convex portions at said crank shaft respectively, and being inserted onto said crank shaft axially adjacent said chain gear respectively so as to be supported in relation of being non-rotatable and not axially movable with respect to said crank shaft;

an engaging means provided between said plates and chain gear so as to prevent said chain gear from being rotated with respect to said crank shaft; and, a stopper provided at said one axial end of the crank shaft inwardly of the concave and convex portions for restricting said gear-fixing plates from being axially inwardly moved;

said fixing means comprising screw means screwed with said crank shaft to urge said crank arm toward said stopper to sandwich said gear-fixing plates and chain gear between said stopper and said boss of said crank arm.

2. The gear crank for a bicycle according to claim 1, wherein said gear-fixing plates are paired and inserted onto said crank shaft on opposite sides of said chain gear to be in contact with both axial surfaces of said chain gear respectively.

3. The gear crank for a bicycle according to claim 1, wherein said engaging means comprises a plurality of projections extending outwardly axially of at least one of said chain gear and gear-fixing plates; and bores on at least the other of said chain gear and gear-fixing plates into which said projections are received.

4. The gear crank for a bicycle according to claim 1, wherein said engaging means comprises a plurality of elongaged projections formed at opposite surfaces between said contacting chain gear and gear-fixing plates in the radial direction thereof.

5. The gear crank for a bicycle according to claim 1, wherein said bore at the center of the chain gear is provided at its inner periphery with concave and convex portions to be fitted with said concave and convex portions at the crank shaft.

6. The gear crank for a bicycle according to claim 1, wherein a washer is inserted between said stopper and one of said gear-fixing plates.

* * * * *